(12) United States Patent
Kaule (10) Patent No.: US 6,688,221 B1
(45) Date of Patent: Feb. 10, 2004

(54) VALUABLE DOCUMENT WITH A SECURITY ELEMENT

(75) Inventor: Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/673,638
(22) PCT Filed: Apr. 27, 1999
(86) PCT No.: PCT/EP99/02849
§ 371 (c)(1),
(2), (4) Date: Dec. 28, 2000
(87) PCT Pub. No.: WO99/56964
PCT Pub. Date: Nov. 11, 1999

(30) Foreign Application Priority Data

Apr. 30, 1998 (DE) .......................................... 198 19 571

(51) Int. Cl.$^7$ ................................................ B41M 1/12
(52) U.S. Cl. ................... 101/129; 101/128.4; 101/401.1
(58) Field of Search ................................ 101/129, 116, 101/128.21, 119, 483, 401.1, 128.4; 283/72, 80, 82, 83, 84, 85, 86, 87, 89, 91

(56) References Cited

U.S. PATENT DOCUMENTS

| 3,934,504 A | * | 1/1976 | Klemm ..................... 101/128.3 |
| 3,967,400 A | * | 7/1976 | Otto .......................... 283/82 |
| 4,177,728 A | | 12/1979 | Koreska |
| 4,652,015 A | * | 3/1987 | Crane ......................... 283/91 |
| 4,718,340 A | * | 1/1988 | Love, III .................... 101/116 |
| 4,801,193 A | * | 1/1989 | Martin ....................... 359/518 |
| 4,816,322 A | * | 3/1989 | Pickering ................... 428/199 |
| 4,892,336 A | * | 1/1990 | Kaule et al. ................. 283/91 |
| 4,943,093 A | * | 7/1990 | Melling et al. .............. 283/83 |
| 4,944,826 A | | 7/1990 | Zollman et al. |
| 5,037,485 A | * | 8/1991 | Chromecek et al. .......... 134/17 |
| 5,147,762 A | | 9/1992 | Verheesen et al. |
| 5,176,405 A | * | 1/1993 | Kaule et al. .................. 283/83 |
| 5,236,968 A | * | 8/1993 | Hirschmann ................ 428/412 |
| 5,324,079 A | * | 6/1994 | Kaule et al. .................. 283/82 |
| 5,335,113 A | * | 8/1994 | Jackson et al. ............... 283/91 |
| 5,335,572 A | * | 8/1994 | Kaule ............................ 83/74 |
| 5,354,099 A | * | 10/1994 | Kaule et al. .................. 283/85 |
| 5,384,007 A | | 1/1995 | Fischer |
| 5,388,862 A | * | 2/1995 | Edwards ...................... 283/82 |
| 5,411,296 A | * | 5/1995 | Mallik ......................... 283/86 |
| 5,465,301 A | * | 11/1995 | Jotcham et al. ............... 283/85 |
| 5,492,370 A | * | 2/1996 | Chatwin et al. .............. 283/82 |
| 5,516,153 A | * | 5/1996 | Kaule ........................... 283/85 |
| 5,627,663 A | * | 5/1997 | Horan et al. .................. 283/86 |
| 5,639,126 A | * | 6/1997 | Dames et al. ................. 283/83 |

(List continued on next page.)

FOREIGN PATENT DOCUMENTS

| DE | 3610379 A1 | | 10/1987 |
| DE | 422598 | * | 1/1994 |
| DE | 42 22598 | * | 1/1994 |
| EP | 0 613 786 A1 | | 9/1994 |
| JP | 1-152459 | * | 6/1989 |
| WO | 94/13749 | | 9/1994 |
| WO | 9605058 | * | 2/1996 |

Primary Examiner—Eugene H. Eickholt
(74) Attorney, Agent, or Firm—Bacon & Thomas, PLLC (57) ABSTRACT

The invention relates to a method for producing security foils for objects of value such as papers of value consisting of a carrier foil and a cover layer applied thereto, the cover layer having the form of characters or patterns and/or coating-free areas in the form of characters, patterns or the like. In this method a printing form fastened in a printing machine is imaged so that areas of the form are ink-accepting, subsequently the form is inked and a carrier foil printed. In the next step the printed carrier foil is provided with a thin cover layer and finally the printed inking and the cover layer thereabove are removed so that coating-free areas arise.

27 Claims, 4 Drawing Sheets

U.S. PATENT DOCUMENTS

| | | | | |
|---|---|---|---|---|
| 5,662,821 A | * | 9/1997 | Ruckl | 492/4 |
| 5,688,587 A | * | 11/1997 | Burchard et al. | 283/80 |
| 5,713,287 A | * | 2/1998 | Gelbart | 101/467 |
| 5,714,213 A | * | 2/1998 | Antes et al. | 101/28 |
| 5,759,420 A | * | 6/1998 | Minnetian et al. | 216/24 |
| 5,783,275 A | * | 7/1998 | Mück et al. | 428/138 |
| 5,801,857 A | * | 9/1998 | Heckenkamp et al. | 283/86 |
| 5,807,456 A | * | 9/1998 | Kaule | 156/230 |
| 5,820,971 A | * | 10/1998 | Kaule et al. | 428/209 |
| 5,824,447 A | * | 10/1998 | Tavernier et al. | 430/124 |
| 5,843,560 A | | 12/1998 | Ohta et al. | |
| 5,857,410 A | * | 1/1999 | Watanabe et al. | 101/128.4 |
| 5,876,068 A | * | 3/1999 | Schneider et al. | 283/86 |
| 5,882,463 A | * | 3/1999 | Tompkin et al. | 156/234 |
| 5,915,731 A | * | 6/1999 | Jackson | 283/91 |
| 6,014,928 A | * | 1/2000 | Delmee | 101/128.4 |
| 6,155,165 A | * | 12/2000 | Kaule | 101/116 |
| 6,155,605 A | * | 12/2000 | Bratchley et al. | 283/72 |
| 6,171,429 B1 | * | 1/2001 | Aindow | 156/324 |
| 6,255,948 B1 | * | 7/2001 | Wolpert et al. | 283/82 |
| 6,318,758 B1 | * | 11/2001 | Stenzel et al. | 283/91 |

* cited by examiner

VALUABLE DOCUMENT WITH A SECURITY ELEMENT

BACKGROUND OF THE INVENTION

1. Field of the Invention

This invention relates to a method for producing security foils for objects of value such as papers of value consisting of a transparent or translucent carrier foil and a cover layer applied thereto which is present in the form of characters or patterns and/or has coating-free areas in the form of characters, patterns or the like which are clearly recognizable in particular in transmitted light.

2. Related Art

Security foils in the form of threads or bands which are embedded in papers of value such as bank notes, checks, identity cards, credit cards and the like are known. To increase security and as protection from forgery such threads are frequently provided with so-called negative writing. Said writing is formed by metal-free areas in an otherwise all-over metallic coating of the transparent carrier material forming the threads. If one holds a paper of value containing such a thread against the light, the thread basically appears dark because of the opaque metallic coating. The metal-free areas stand out against this dark background as light and contrasting. This conspicuous incident/transmitted light effect provides very good protection from forgery. The protective effect of the negative writing lies in the elaborate and complicated production requiring great know-how, high equipment expense, special printing inks and a great number of operations. In contrast, usual printed information can be forged true to the original without great effort using copiers and printers available today.

Security foils are also known which have diffraction structures such as conventional holograms, cinegrams, pixelgrams, etc. The protection from forgery by said elements is based on the viewing angle-dependent interplay of colors which said elements show. Such security foils are frequently applied to the surface of objects of value in the form of strips or labels.

Mass production of the diffraction structures is usually effected by converting the diffraction structures into a relief structure which is subsequently used as an embossing die. Embossing is usually done in a thermoplastic layer or a lacquer or resin layer curable during the embossing process. Said layers can possibly be provided before the embossing process with a thin metal layer which on the finished product ensures that the diffraction structures are recognizable in reflected light. However, the metalization process is frequently effected only after embossing, in particular when embossing is done in liquid to viscous materials such as UV-curable lacquers which are only cured during the embossing process by corresponding treatment, e.g. irradiation with UV light.

Said production of such embossed lacquer layers can be effected directly on the object to be protected. According to an alternative, very common technology, transfer foils containing the embossed lacquer layer in their layer structure are produced in a separate operation. This layer structure is subsequently transferred to the object of value by means of suitable adhesive layers.

To increase the protection from forgery it has also been proposed to provide the reflecting layer of such a diffraction structure with negative writing, i.e. with gaps in the form of characters, patterns or the like (EP 0 330 733 A1). EP 0 330 733 A1 also states different methods for producing such gaps. Besides conventional etching methods, reference is also made to a production method by which an ink having thermoplastic properties and softening and becoming gluey at higher temperatures is printed on the metal-coated side of the foil. If a thus pretreated foil is laminated against a second untreated sheet of foil using heat and pressure, the two foils stick together in the area of the printed characters or patterns. When the two foils are separated the areas corresponding to the characters or patterns are then detached from the metal coating.

For producing packaging material it is known from DE-OS 36 10 379 to first print a printed image on the foils as is to appear later as a negative image in the metal coating, and only apply the metal coating in a second method step. The printing method can be intaglio or flexographic printing. For applying the printed image one uses inks or lacquers having low adhesion to the metal coating. The metal coating is then removed mechanically by the action of an air or liquid jet or by a mechanical squeegee.

All said known methods have in common that the information which is later to be present in the form of gaps must be printed with poorly adhesive or etching inks in a certain operation. Separate printing forms must be produced for this printing operation. Production of the forms is very elaborate. For an intaglio cylinder for example, a metallic cylinder must be prepared very elaborately, i.e. copperplated, polished, provided with the information to be printed and finally chromium-plated. The printing cylinder can in addition only be used for the particular printing job. In particular for mass articles such as holograms, negative characters can therefore only be provided if an accordingly high number of holograms is produced so that the additional costs are distributed over as many final products as possible. For small runs or productions which are to be provided with different negative characters, the production costs are hitherto prohibitive.

BRIEF SUMMARY OF THE INVENTION

The invention is accordingly based on the problem of proposing a method for producing security elements with negative writing that permits cost-effective production even for small runs or varying information.

The invention is based on the finding that the negative characters can be produced using simple and flexible printing processes based on highly modern digital technology which cannot be used in direct security printing. Said printing processes are readily accessible and frequently involve little equipment expense, so that information produced by such printing processes can be reproduced or forged just as easily and true to the original. For this reason one still uses in security printing complicated and elaborate techniques such as intaglio printing that cannot be imitated with customary printing processes used in computer technology.

With negative writing, however, the protective effect is not determined by the printing process used but by the plurality of working steps and their interaction. In most methods for producing negative writing, the direct printing result no longer appears on the final product. If the negative writing is produced by means of solvents for example, the print disposed in certain areas under the all-over opaque, preferably metallic layer and the opaque layer directly thereabove are removed by the action of the solvent. Since this production process is in addition effected in protected surroundings, it is not necessary to use a complicated and preferably forgery-proof printing process such as intaglio printing for the print.

According to the invention one therefore produces negative characters using printing processes permitting a simple and fast change of the information to be printed, regardless of the fact that the printing result might possibly be easily forged.

According to the inventive method one images the printing form already fastened in the printing machine, for example a printing cylinder. Imaging of the form is effected by means of digital data in computer-controlled fashion. This has the advantage that the information to be printed can be previously composed and processed on the monitor. Imaging of the form in the printing machine is preferably reversible, i.e. new imaging of the form can be effected very quickly, if necessary between two printing operations. One can thus vary the information to be printed quickly and easily without having to interrupt the continuity of the production process.

According to a preferred embodiment, the printing form used is an intaglio form provided with all-over screen engraving. For imaging in the printing machine the total screen is filled with a readily curable lacquer and cured. The lacquer is then removed from the screen dots, which are later to be ink-accepting, by means of laser radiation, spark erosion or other suitable measures installed in the printing machine. The filling lacquer can be thereby removed completely or also only in part, depending on how much ink is to be transferred. After each impression of the printing form the screen can be refilled and reimaged.

In a further embodiment, a screen printing form provided with an all-over screen structure is used. In the printing machine the screen structure is filled with a light-curable lacquer. Imaging is subsequently effected likewise in the printing machine by removing the lacquer from the screen holes which are later to give the color, by laser radiation or other suitable measures. After each printing operation the screen holes can be closed and reimaged.

According to a further embodiment, the printing form used can be an offset form which is exposed in the printing machine by the action of a laser beam or by spark erosion in the areas which are to be ink-accepting.

Alternatively, imaging of the printing form can also be effected simply by electrophotographic methods, similar to a laser printer.

The abovementioned methods fall under the printing terms "direct imaging," "digital printing," direct to press" or "direct to print." Printing processes working on the principle of the laser printer are for example frequently classed under the term "digital printing." The methods known under said terms and not explicitly mentioned can likewise be used within the scope of the invention, provided a fast and simple change of the information to be printed is ensured.

The thus imaged, preferably cylindrical printing form is subsequently used to print a carrier foil in the form of the later characters or patterns, according to an embodiment of the inventive method. Subsequently the total printed carrier foil is provided with a thin cover layer. For producing the coating-free areas one finally removes the inking and the cover layer thereabove.

According to a preferred embodiment, the carrier foil is present in the form of an endless band so that the method can be performed continuously. The term "carrier foil" stands for all kinds of carrier materials such as plastics, metals or papers of any composition.

The cover layer is preferably a metal layer applied to the carrier foil by the vapor deposition method. However, one can also use any other cover layers such as color layers, interference layers, dichroic layers, semitransparent dielectric layers or semitransparent metallic layers or the like. The color layers can be layers containing any printing inks or special feature substances. Feature substances used can be magnetic, luminescent, thermochromic, iridescent and/or other substances having a special physical and/or chemical effect.

Removal of the cover layer is preferably effected with a liquid solvent. One can use known solvents such as water, alcohols, aqueous solutions, acids or lyes.

According to a further aspect of the invention, however, one can also use strong organic solvents such as benzin, benzene, xylene, turpentine, perchloromethane, dichloromethane or the like. They are preferably used in closed circuits in order to avoid environmental pollution.

Organic solvents have the advantage of also dissolving inks and lacquers printable with printing processes such as offset printing which allow production of type heights up to 0.1 mm. Customary printing processes used for producing negative characters such as intaglio printing only permitted type heights above 0.2 mm. Thus, the invention for the first time allows extremely fine lines and small font sizes to be produced as negative characters.

However, the use of organic solvents is not restricted to the methods for producing negative characters explained in connection with the invention. They can also be used advantageously with known production methods. In connection with the inventive printing processes, however, organic solvents are preferably used in cases where the inventively imageable printing forms can be assigned to the offset methods or electrophotographic methods, while known solvents such as water, acids, lyes, etc., are preferably used when the directly imaged form can be assigned to the intaglio or screen printing methods.

The washout process can possibly be supported by mechanical means such as a rotating roll or brush. The additional action of ultrasound is also possible.

The thus produced carrier foil can finally be cut into threads or bands in a last step. If said threads or bands are to be used as security threads for papers of value, their width should be at most 5 mm.

Alternatively, the carrier foil can also be designed as a label or transfer foil. In the case of the transfer foil, the carrier foil is preferably provided before printing of the negative image with a separation layer to ensure easy detachment of the carrier foil from the remaining layer structure after transfer to the final object. Subsequently the carrier foil is processed according to the inventive method and finally provided with an adhesive layer in a last step. This may involve a hot-melt adhesive or radiation-curable adhesive.

According to a further preferred embodiment, the carrier foil can be provided before printing of the negative image with a lacquer layer in which a relief structure is embossed, preferably in the form of a diffraction structure.

According to a further embodiment, the carrier foil can also be the object of value itself, such as a register mark, seal, document of value or another object, or it can form part of the object of value, for example if a one-layer ID card is to be provided only partly with a cover layer. If the ID card consists of a plurality of layers, one of the layers can be provided e.g. with an esthetically appealing cover layer, such as an aluminum or gold layer, having gaps which constitute information and/or are dimensioned so as to reveal information or patterns therebelow.

The negative characters can also be produced by etching techniques within the scope of the invention. The carrier foil is first provided with the cover layer and subsequently printed in an inventively imaged printing machine with an etching ink which dissolves the cover layer. Alternatively, a protective lacquer can be printed in the printing machine to ensure that the cover layer is not removed in these areas in a subsequent etching process. This method is suitable in particular for producing positive characters, i.e. characters or patterns constituted by the cover layer itself. Such characters can of course also be produced by the methods explained above. In this case the total foil except for the desired characters must be printed with etching ink or a soluble ink. The term "characters" stands for letters, numbers, patterns or the like and for combinations thereof, as in connection with all other embodiments.

Negative and/or positive characters can also be produced according to a further variant of the invention by applying an adhesive to the carrier foil in an inventively imaged printing machine in a first step and subsequently disposing the cover layer only in these adhesive-coated areas. For this purpose the cover layer is preferably prepared on a transfer foil and is brought in contact with the adhesive-coated carrier foil. If the adhesive layer involves hot-melt adhesive, heat must simultaneously be supplied in order to make it adhesive. When the transfer foil is subsequently removed the cover layer sticks to the carrier foil in the area of activated adhesive. This procedure is chiefly suitable for cover layers containing feature substances and executed as positive writing since such layers are frequently very hard to print, if at all, due to the size of the feature substance pigments.

The inventive methods have the advantage that the simple imaging of the form already fastened in the printing machine keeps production costs low. No elaborate additional processes such as etching or galvanizing intermediate forms are required whatsoever. This also permits small lots to be printed cost-effectively. If the imaging of the form can be erased and replaced with new imaging, one can even produce different information in the form of a negative and/or positive image within a running job. This offers the possibility of producing individualized information. If the carrier foil produced by the inventive method is used for example for protecting identity cards, passports or other user-related documents, one can thus produce security elements such as holograms or cinegrams, etc., whose metalization has gaps in the form of special user-related data such as account number, name, etc., or whose metalization is only present in the form of certain user-related data so that the optically variable effect occurs only in the area of the individualized information.

Direct imaging of the form in the printing machine moreover avoids register difficulties. If the form is imaged outside the printing machine, distortions occur when it is installed. The advantage of freedom from distortion is especially important if the inventively produced print is to be provided in register with information already located on the foil, e.g. diffraction structures.

The information produced with the inventive methods can also be combined with further layers such that it does not appear visually. If the cover layer partly applied according to the invention contains a feature substance for example, the intermediate areas free from cover layer can be printed with a layer having the same visual appearance as the cover layer but containing no feature substance. The information becomes recognizable only by machine detection of the feature substance.

The camouflage layer can also be formed as an all-over layer disposed above and/or below the cover layer, however. It is to be coordinated with the cover layer and the information constituted thereby in each individual case.

BRIEF DESCRIPTION OF THE DRAWINGS

Further examples and advantages will be explained with reference to the Figs., in which.

DETAILED DESCRIPTION OF PREFERRED EMBODIMENTS OF THE INVENTION

Figure 1:
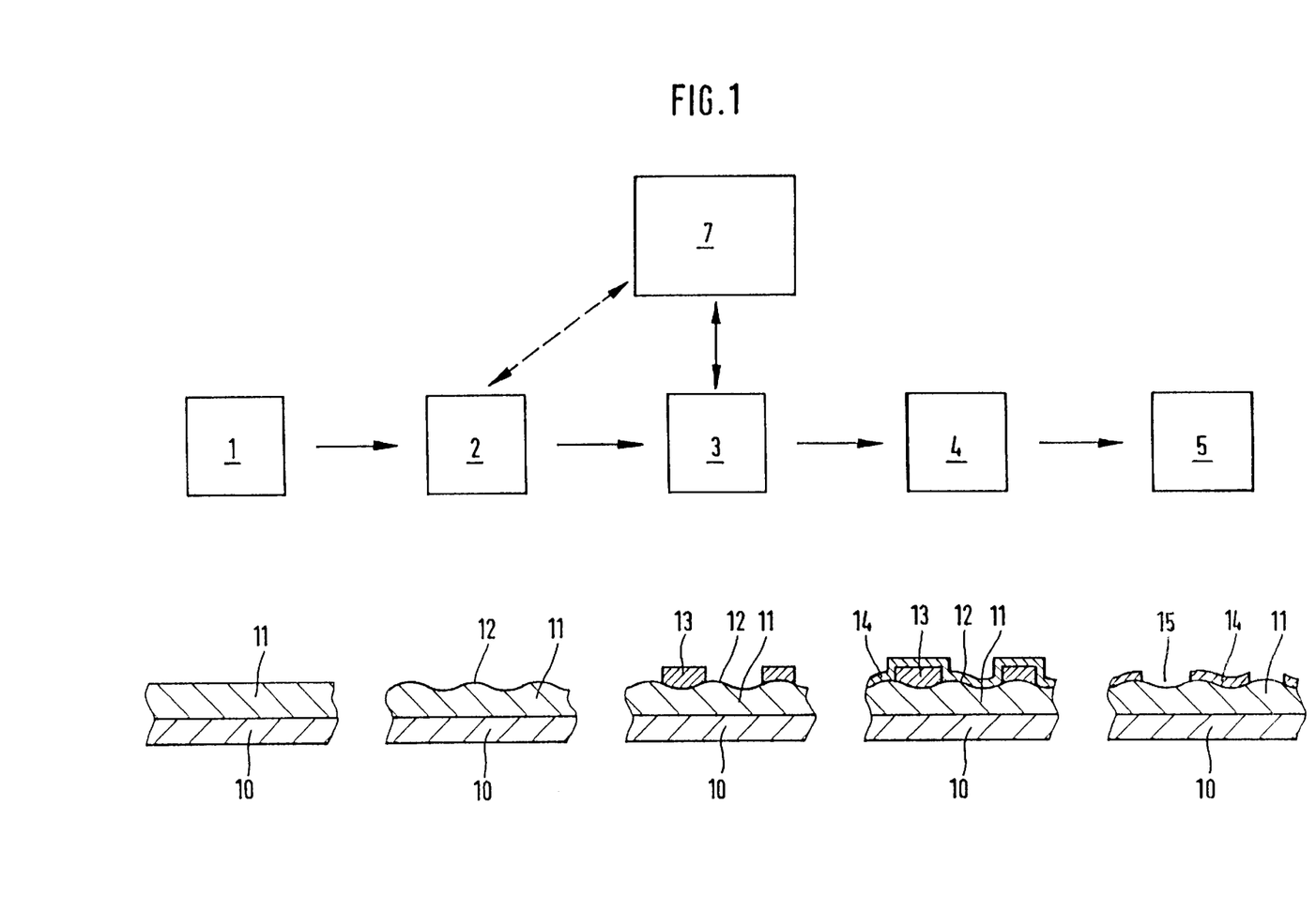
FIG. 1 shows a schematic view of an apparatus for performing the inventive method, and a view of the individual processing steps on a carrier foil.

FIG. 1 shows schematically the individual processing stations for producing a hologram foil with negative writing. Only the essential processing stations are shown. Depending on the product to be produced, one can require more or fewer apparatuses or method steps. Under each processing station one can see the layer structure of the carrier layer after running through the particular station. In processing station 1 preferably translucent or transparent carrier foil 10 is coated with lacquer layer 11. Station 2 is an embossing station in which lacquer layer 11 is provided with relief structure 12 in the form of a diffraction structure. In following printing station 3 the embossed surface of lacquer layer 11 is provided with printed image 13 corresponding to the later negative image. In following station 4 the layer structure is provided with a cover layer, preferably metal layer 14. Usually, the metal layer is applied by vapor deposition so that station 4 is usually a vapor deposition unit. In following station 5 one now removes ink 13 applied in printing station 3 and cover layer 14 located above ink 13. Usually, this is done with the aid of solvents such as water, xylene, or the like. The washing process can be supported by brushes or ultrasound. After the washing process, metal layer 14 has gaps 15 in the form of the desired negative image.

The printed image transferred to the carrier foil in printing station 3 is produced with the aid of electronic data processor 7. The desired pattern can be generated on the monitor by an operator or introduced into data processor 7 via a scanner. Further processing of the stored information might be necessary. The information is then passed on directly to the form fastened in printing station 3 or a corresponding imaging apparatus for the form. Depending on the printing system used, one uses the transmitted control data for imaging the particular form.

The data processor can additionally serve as a control between embossing station 2 and printing station 3 to permit print 13 to be applied in the proper place relative to embossed information 12.

Figure 2A:
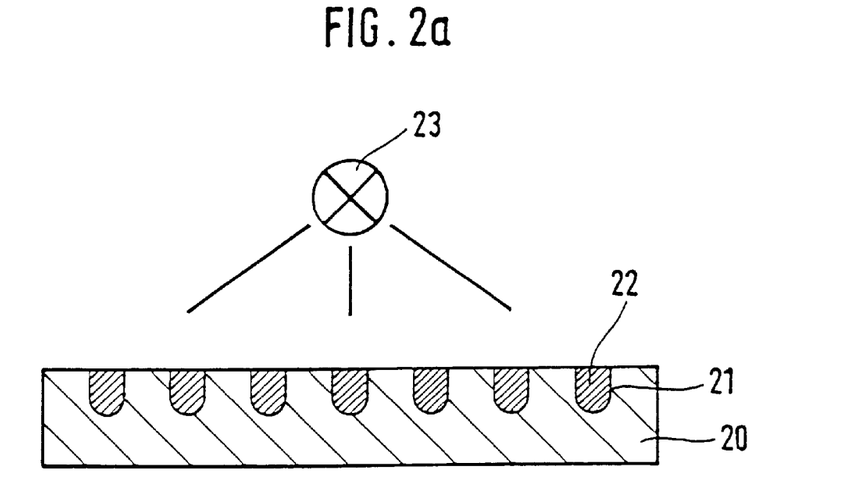
FIGS. 2a and 2b show a view of the processing steps for imaging an intaglio plate.
Figure 2B:
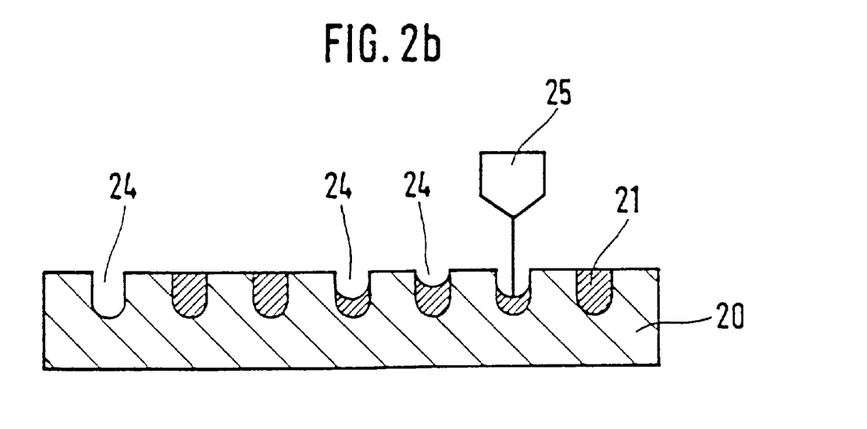

Printing station 3 can be for example an intaglio printing unit with an intaglio plate or intaglio cylinder. FIG. 2 shows schematically the individual processing steps for imaging intaglio plate 20 according to the invention. Intaglio plate 20 preferably has all-over screen engraving 21 which is filled with readily curable lacquer 22 such as UV-curable lacquer and subsequently cured. This can be done for example by means of UV lamp 23, as shown in FIG. 2a. The depth of the screen dots corresponds to the maximum ink to be transferred. Ink-accepting screen dots 24 which produce later print 13 are subsequently exposed for imaging, the amount of removed lacquer material 22 permitting adjustment of the depth of the cells and thus the amount of ink to be transferred. Selective removal can be effected for example by means of laser 25, as shown in FIG. 2b. The exposed screen dots can now be filled with ink, as with a usual intaglio plate, while the screen dots filled with cured lacquer accept no ink. This system has the advantage of being reversible, i.e. the information to be printed is erasable and thus variable since the screening can be repeatedly filled and imaged. This permits the printing cylinder to be provided with new information to be printed between two printing operations.

Alternatively, one can use electrophotographic methods. In this case the printing cylinder is charged electrostatically in accordance with the information to be printed so that toner accumulates only in the areas to be printed.

Figure 3:
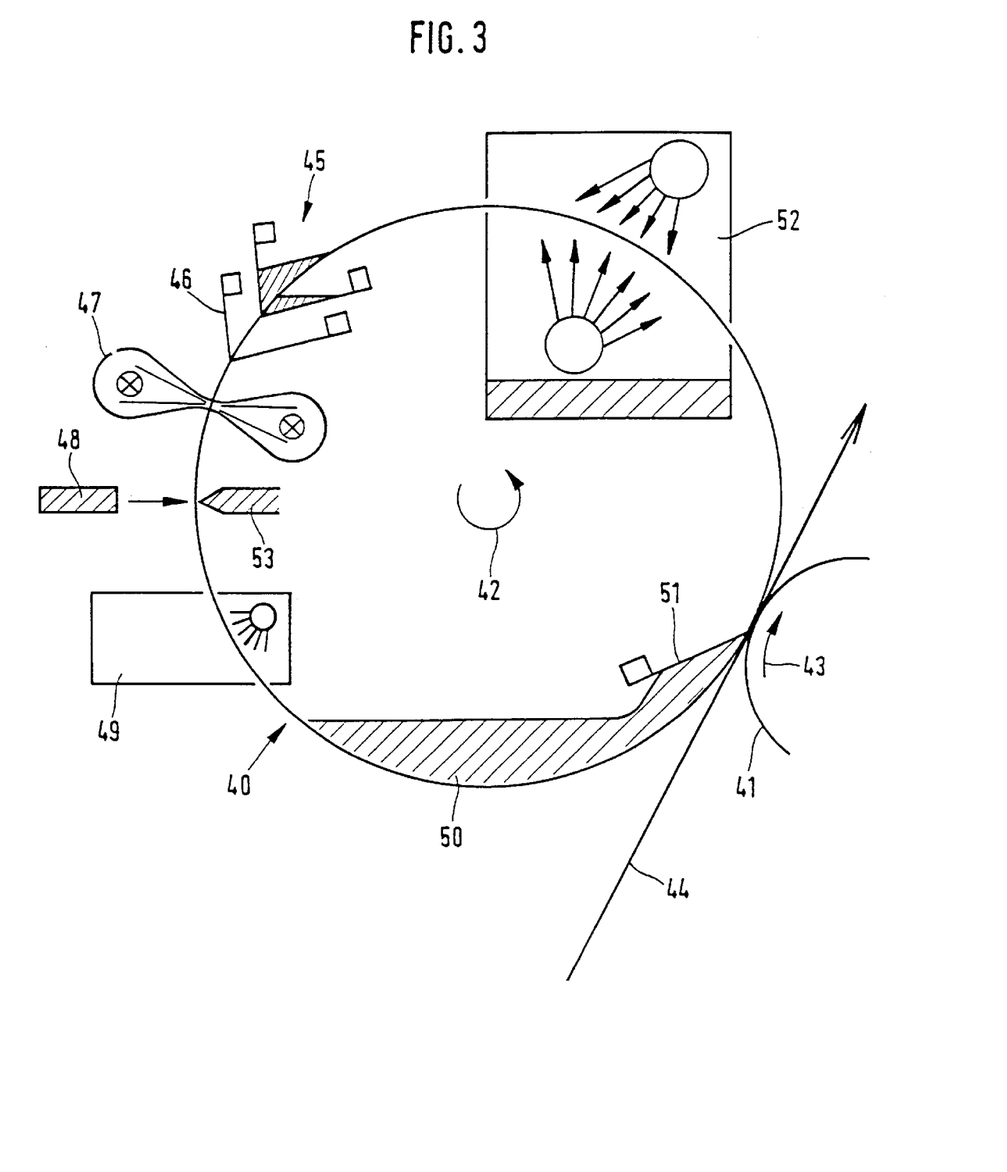
FIG. 3 shows an inventive computer-to-process screen printing unit.

FIG. 3 shows schematically the individual processing steps for imaging a computer-to-press screen printing unit. Cylindrical screen 40 and counterpressure cylinder 41 rotate in the direction of arrows 42, 43. Printing sheet 44 moves therebetween at equal rotating surface velocity. The other apparatuses shown are mounted in stationary fashion. Imaging of screen printing raw cylinder 40 begins in station 45 in which a lacquer is supplied to close the screen holes. Preferably, apparatus 45 is a UV lacquer squeegee. Subsequent squeegee 46 cleans the screen of surplus lacquer. Subsequently, the applied lacquer is cured in apparatus 47. In the present case, apparatus 47 comprises a UV lamp aggregate consisting of two UV lamps, one lamp being disposed inside and the other outside the screen printing cylinder. Individual screen holes are then reopened selectively in the form of the information to be printed in computer-controlled fashion in station 48. This can be done for example by means of a laser, an air nozzle apparatus or another apparatus. If the screen holes are opened with a laser, it may be useful to dispose nozzle 53 inside the screen for simultaneously removing the dissolved material. In station 49 the screen is freed from lacquer particles which have stuck to the screen during opening of the individual holes in station 48. This cleaning is preferably done with the aid of spray nozzles. This concludes the imaging process of the screen printing cylinder. When thus imaged screen printing cylinder 40 rotates away under ink 50 disposed inside the cylinder, ink is transferred to printing stock 44 in the area of squeegee 51 only in the area of the screen holes opened by the method described above. When the printing operation is completed the screen is finally freed from ink residues in further cleaning station 52. Subsequently the cycle can begin anew if another printed image is to be transferred to printing stock 44.

Instead of a UV lacquer, one can also use thermoplastic materials which are likewise UV-curable. One can also use solvent-containing thermoplastics. In this case the UV lamps must be replaced by a corresponding drying station having IR radiators for example. Thermoplastic materials also have the advantage of being already removable from the individual screen openings before drying. That is, station 48, 53 is disposed before drying station 47.

This arrangement stands as an example of computer-to-press screen printing units. The same functions are also realizable in flat screen printing. With a flat screen one has the possibility of making the individual stations swivel in or away. Alternatively, it is possible to introduce the screen successively into the various stations integrated in the printing machine and bring it into the printing position only at the end of the cycle.

One can also use other ways of supplying ink such as a chamber squeegee, other ways of imaging such as spark erosion. It is only important according to the invention that imaging is effected in a screen printing unit by closing and opening the holes within the printing machine.

Figure 4:
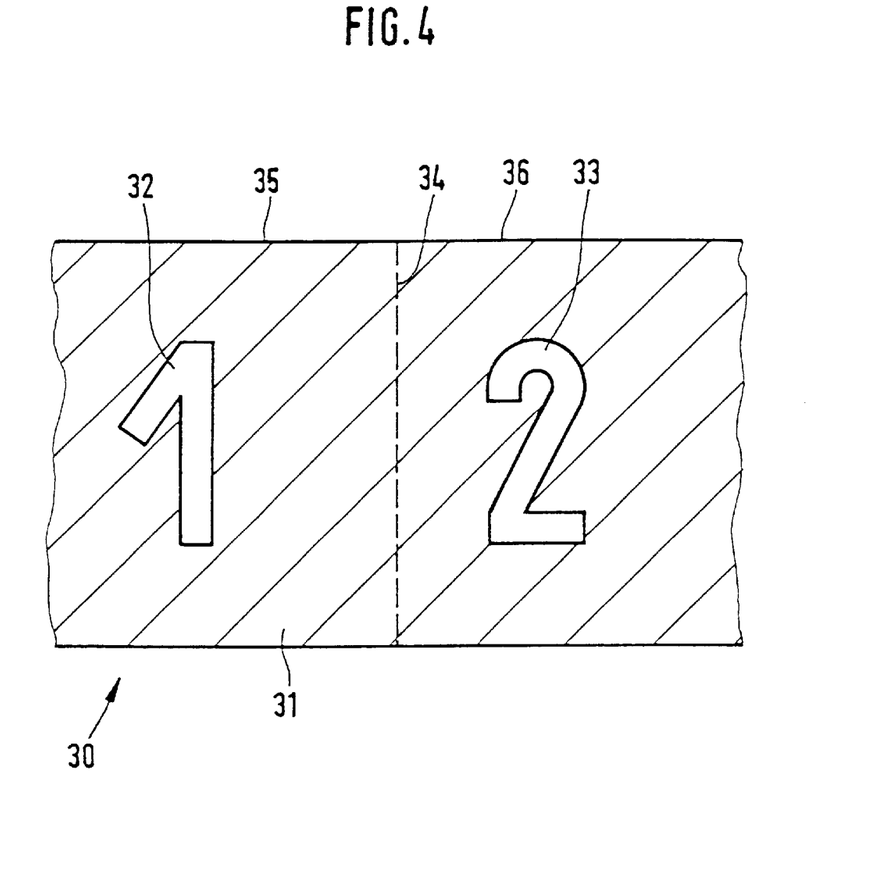
FIG. 4 shows an inventive carrier foil in a top view.

FIG. 4 shows endless foil 30 produced according to the inventive method in a top view. Opaque coating 31, preferably a metal layer, has gaps in the form of information 32, 33. This information varies along the endless foil. The essential thing is that the information varies not only within the area corresponding to the printing area of the plate or the circumference of the cylinder, but also therebeyond. That is, the repetition rate of the information is greater than the printable area given by the printing form. Such a foil can be produced only by one of the inventive methods since only they allow fast and cost-effective variation of the information to be printed during the continuous production process of the endless foil.

Information 32, 33 shown in FIG. 4 belongs to different security elements 35, 36 which are in each case connected with an object to be protected later. In FIG. 4 this is indicated by dashed line 34. If security foil 30 is for example a transfer foil and the object to be protected is bank note paper which is likewise present in endless form, each bank note copy is provided with a security element during the transfer process. If inventive security foil 30 is used, each bank note copy is thus provided with an individualized security element.

The inventive method can also be used especially advantageously in connection with the production of passports and ID cards. Information 32, 33 can constitute for example parts of user-related data such as the account number, the name, etc., or at least be related to said data.

In the shown case, cover layer 31 only has gaps 32 in the form of characters. However, the cover layer may conversely be present only in the character- or pattern-shaped areas. Combinations of positive and negative images are also possible.

The foil produced according to one of the inventive methods can be designed as a transfer foil or also be cut into security elements of any form which are subsequently fastened to an object to be protected. This may be a document of value such as a bank note, ID card, passport, check or the like, or another product to be protected such as a book, CD, etc.

What is claimed is:

1. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the imaging of the form is carried out in a manner whereby the imaging can be erased again and replaced by a new imaging.

2. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the form used is an offset form which is exposed by spark erosion or luminous radiation in the areas which are to be ink-accepting.

3. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the form used is a screen printing form which is imaged in the printing machine according to the following steps:

the screen has openings that are closed all over with a readily curable lacquer, the screen openings which are to be ink-permeable are reopened by means of a computer-controlled tool.

4. The method according to claim 3, wherein the screen openings are closed with a UV-curable lacquer.

5. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the imaging of the form is effected electrophotographically.

6. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the carrier foil is provided in the form of an endless band and the method is performed continuously.

7. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, wherein the carrier foil is provided after the step of providing a carrier foil with a lacquer layer in which a relief structure is embossed.

8. The method according to claim 1, 2, 3, 5, 6 or 7, wherein the imaging of the form is effected by means of digital data in computer-controlled fashion.

9. The method according to claim 1, 2, 3, 5, 6 or 7, wherein the form is configured as a cylinder.

10. A method for producing a security foil having at least a cover layer which is present in the form of characters and/or has coating-free areas in the form of characters, comprising the steps:

providing a carrier foil, forming a thin cover layer on the carrier foil, imaging at least one printing form fastened in a printing machine so that areas of the form are ink-accepting, inking the form with an ink capable of etching the cover layer, printing the carrier foil using the inked form so that the cover layer is removed by the ink in the printed areas and said coating-free areas are created;

wherein said step of imaging is carried out in a manner whereby the imaging can be erased again and replaced by a new imaging.

11. A method for producing a security foil having at least a cover layer which is present in the form of characters and/or has coating-free areas in the form of characters, comprising the steps:

providing a carrier foil, forming a thin cover layer on the carrier foil, imaging at least one printing form fastened in a printing machine so that areas of the form are ink-accepting, inking the form, printing the carrier foil using the inked form, etching away the cover layer in the unprinted areas of the carrier foil so that coating-free areas are created, wherein said step of imaging is carried out in a manner whereby the imaging can be erased again and replaced by a new imaging.

12. A method for producing a security foil having at least a cover layer which is present in the form of characters and/or has coating-free areas in the form of characters, comprising the steps:

a) providing a carrier foil, b) printing the carrier foil in the form of a negative image of the characters and/or of coating-free areas in the form of characters using a soluble ink, c) forming a thin cover layer on the printed carrier foil and the printing, d) removing the ink and the cover layer disposed in the inked area using a strong organic solvent so that only the cover layer in the form of characters remains on the carrier foil and/or coating-free areas in the form of characters arise in the cover layer.

13. The method according to claim 12, wherein a type height of the printing is between 0.1 and 0.2 mm.

14. The method according to claim 12, characterized in that an offset or electrophotographic method is used for producing the print.

15. A method according to claim 12, wherein the strong organic solvent used is selected from the group consisting of xylene, benzin, benzene, turpentine, perchloromethane and dichloromethane.

16. A method for producing a security foil having at least a cover layer which is present in the form of characters and/or has coating-free areas in the form of characters, comprising the steps:

a) providing a carrier foil, b) imaging at least one printing form fastened in a printing machine so that areas of the form are ink-accepting, c) providing the form with an adhesive layer in the ink-accepting areas, d) printing the carrier foil with the adhesive layer using the printing form, e) contacting the printed carrier foil and adhesive layer with a color layer having a feature substance, f) removing the color layer in the areas of the carrier foil not coated with adhesive printing.

17. The method according to claim 16, wherein the color layer is disposed on a transfer foil which is removed in step f).

18. The method according to claim 1, 3, 7 or 16, wherein the finished security foil is cut into threads or bands.

19. The method according to claim 16, wherein said feature substance has physical or chemical effect properties selected from the group consisting of magnetic, luminescent, thermochromic and iridescent.

20. The method according to claim 18, wherein said threads or bands have a width of 0.5 to 20 mm.

21. A method for producing a security foil having at least a cover layer which is present in the form of characters and/or has coating-free areas in the form of characters, comprising the steps:

providing a carrier foil in the form of an endless band, forming a thin cover layer on the carrier foil, imaging at least one printing form fastened in a printing machine so that areas of the form are ink-accepting, inking the form with an ink capable of etching the cover layer, printing the carrier foil using the inked form so that the cover layer is removed by the ink in the printed areas and said coating-free areas are created, wherein the security foil is produced in a continuous process.

22. A method for producing a security foil having at least a cover layer which is present in the form of characters and/or has coating-free areas in the form of characters, comprising the steps:

providing a carrier foil in the form of an endless band, forming a thin cover layer on the carrier foil, imaging at least one printing form fastened in a printing machine so that areas of the form are ink-accepting, inking the form, printing the carrier foil using the inked form, etching away the cover layer in the unprinted areas of the carrier foil so that coating-free areas are created, wherein the security foil is produced in a continuous process.

23. A security foil produced by a method according to claim 1, 2, 3, 7, 10, 11, 12, 16, 17, 21 or 22.

24. The method according to claim 7, wherein said relief structure is a diffraction structure.

25. A method for producing a security foil having at least a cover layer which is present in the form of characters and/or coating-free areas in the form of characters, comprising the steps:

providing a carrier foil, imaging at least one printing form fastened in a printing machine so that areas of the form are ink-accepting, inking the form, printing the carrier foil using the inked form so that an inking arises, forming a thin cover layer on the printed carrier foil and the inking, removing the inking and the cover layer thereabove to produce the coating-free areas, and providing the finished security foil with an adhesive layer.

26. A method for producing a security foil having at least a cover layer which is present in the form of characters and/or has coating-free areas in the form of characters, comprising the steps:

providing a carrier foil, forming a thin cover layer on the carrier foil, imaging at least one printing form fastened in a printing machine so that areas of the form are ink-accepting, inking the form with an ink capable of etching the cover layer, printing the carrier foil using the inked form so that the cover layer is removed by the ink in the printed areas and said coating-free areas are created, and providing the finished security foil with an adhesive layer.

27. A method for producing a security foil having at least a cover layer which is present in the form of characters and/or has coating-free areas in the form of characters, comprising the steps:

providing a carrier foil, forming a thin cover layer on the carrier foil, imaging at least one printing form fastened in a printing machine so that areas of the form are ink-accepting, inking the form, printing the carrier foil using the inked form, etching away the cover layer in the unprinted areas of the carrier foil so that coating-free areas are created, and providing the finished security foil with an adhesive layer.

* * * * *